United States Patent [19]
Leach

[11] 3,738,077
[45] June 12, 1973

[54] BATCH WEIGHING MACHINE
[75] Inventor: Rex J. Leach, Moorhead, Minn.
[73] Assignee: Paul Horn Farms, Inc., Moorhead, Minn.
[22] Filed: Apr. 26, 1971
[21] Appl. No.: 137,529

[52] U.S. Cl.................. 53/59 W, 177/52, 177/120
[51] Int. Cl............................................ B65b 57/10
[58] Field of Search.................... 53/59 W; 177/52, 177/59, 114, 119, 120, 121, 160

[56] References Cited
UNITED STATES PATENTS
3,516,221  6/1970  Paxton et al.................... 177/120 X
2,889,131  6/1959  Crabb................................. 177/120
2,507,905  5/1950  Hughes.............................. 53/78 X Primary Examiner—Travis S. McGehee
Attorney—John W. Adams

[57] ABSTRACT

This is a batch weighing machine which automatically weighs successive batches of material and thereafter discharges each batch into a container pre-positioned to receive the same. The weighing apparatus is particularly constructed to use a conventional scale for the weighing operation.

5 Claims, 7 Drawing Figures

INVENTOR.
REX J. LEACH
BY
John W. Adams
ATTORNEY

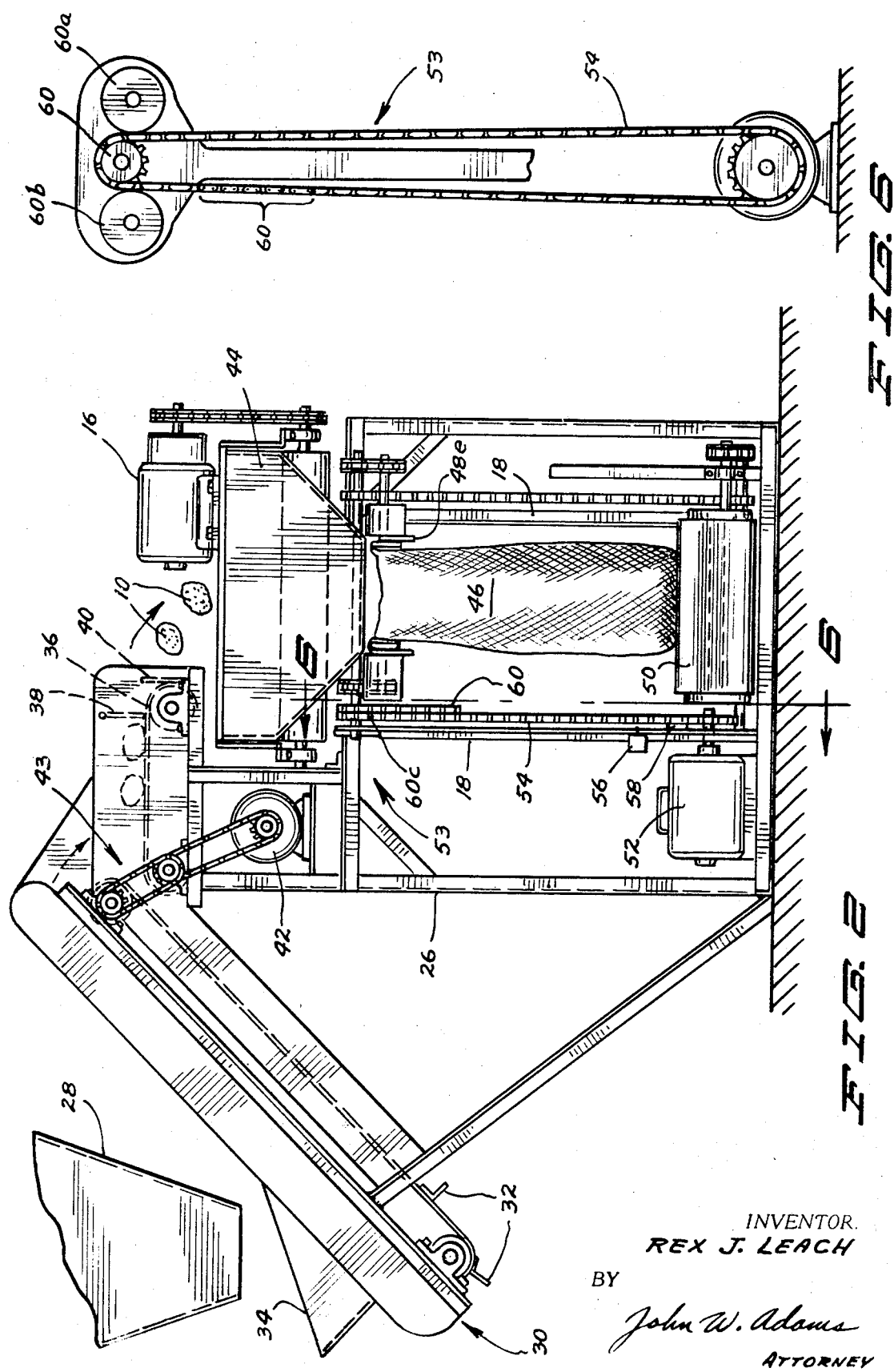

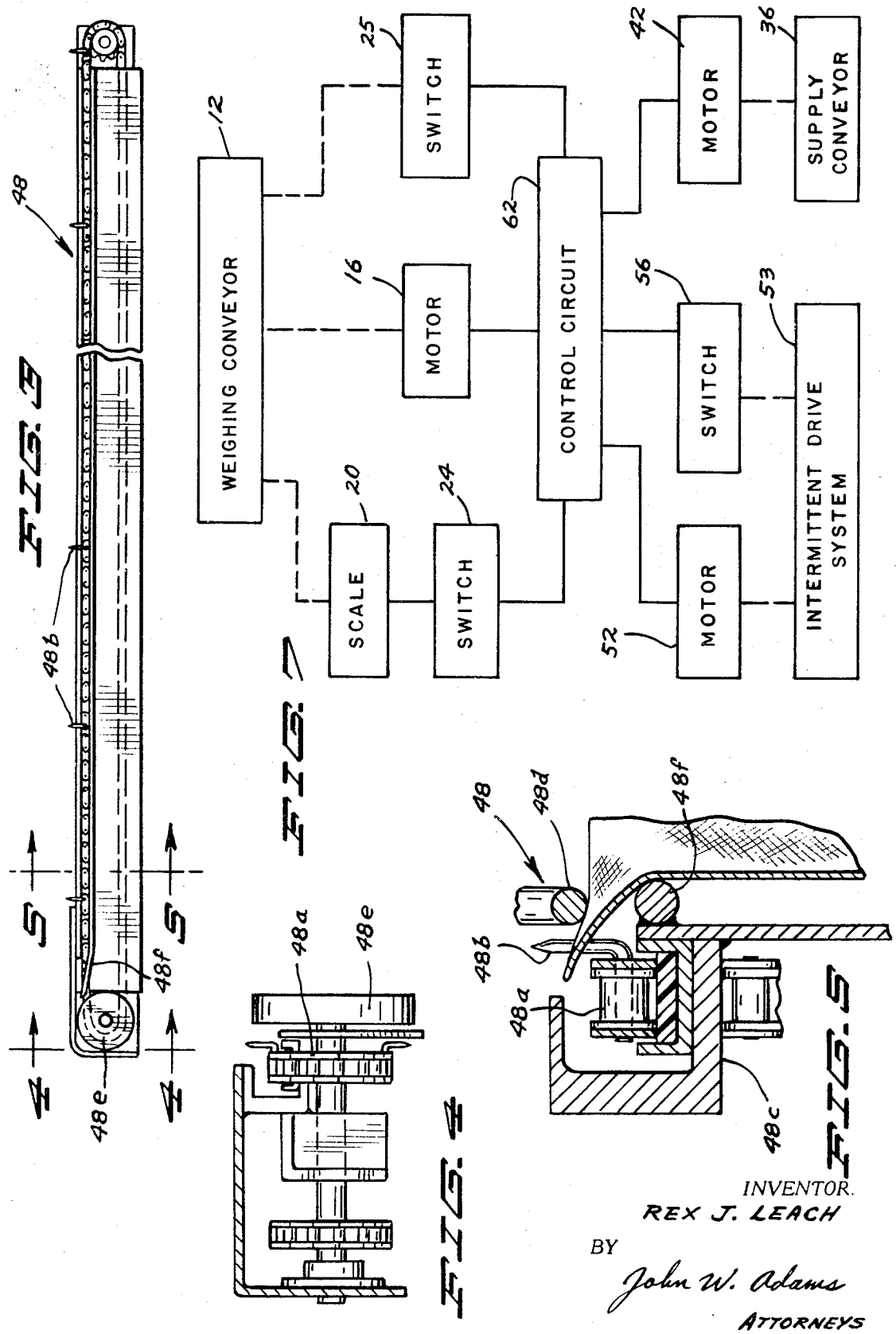

BATCH WEIGHING MACHINE

This invention relates to a batch weighing machine adapted to automatically discharge each batch into a container. The particular embodiment of my invention disclosed herein is adapted particularly for use with items which are weighed and bagged in comparatively heavy batches, such as the weighing and bagging of potatoes or other farm produce with which the one hundred pound batch is customary.

The prior art weighing equipment is generally adapted for weighing batches of material after delivery into containers by limiting the filling of the containers to a pre-determined weight. This equipment is expensive and cumbersome in that the containers must be adequately supported during the filling operation and yet isolated on the weighing equipment so that the true weight is determined. The weighing equipment for weighing batches of material on an intermittently driven weighing conveyor system is relatively simple particularly when adapted for use with a conventional scale construction.

It will be appreciated that empty containers are much more readily handled than full containers and that the equipment for handling empty containers may be considerably lighter in construction in view of the relatively insignificant weight of containers. In potato handling equipment, for example, the containers used are large burlap bags and the handling of such bags while in a full condition requires support from the bottom to keep the bags from being pulled away from the supporting structure required to hold the mouth of the bag open. Providing an isolated weighing platform which will support a large burlap bag from both the top and the bottom without limiting the accuracy of such equipment is difficult and results in cumbersome equipment.

The present invention weighs batches of material such as potatoes, before placing the weighed batches in containers, such as burlap bags, so that the containers may be handled while empty for the greater part of the process and need only be delivered to an operator of the machine or to further automatic handling once the container is filled and sealed. The embodiment of the present invention, herein disclosed, is used for weighing and bagging potatoes in large lots, such as one hundred pounds. The disclosed apparatus consists of a horizontally disposed conveyor which forms a weighing platform and which is mounted on a supporting stand which in turn is supported on a conventional scale. When the pre-determined weight of potatoes has been supplied to the conveyor forming the weighing platform, it is actuated to deliver the batch to a bag filling station. The bag filling station is supplied with burlap bags by a bag supplying conveyor which is loaded with bags to be filled at another location. The filling bags are delivered to an operator of the machine by the bag supplying conveyor advancing as a bag carrying and supporting conveyor lifts the bottom of the bags upwardly on an incline so that the operator may remove the bag from the supporting means on the bag supporting conveyor. One important feature of the invention is the frame structure or supporting stand which is used to support the weighing conveyor on the scale. This supporting stand has a tapered structure descending from the horizontal conveyor platform to the relatively small scale platform and stands independently of the framework supporting the rest of the apparatus.

It is accordingly an object of this invention to make a batch weigher for weighing material adapted to use a conventional weighing scale mechanism.

It is further an object of this invention to make a batch weigher and bagger which weighs the desired amount of material and then discharges the same to a container.

It is yet another object of this invention to make a batch weigher which uses an horizontally mounted intermittently driven conveyor as a weighing platform and which has a supporting stand to support the same on a conventional scale so that weighed batches of material may be discharged into a container pre-positioned at a bag-filling station by a container supply conveyor system.

These and other objects and advantages of this invention will be apparent from the following description made in connection with the accompanying drawing wherein like reference characters refer to similar parts throughout the several views, and in which:

FIG. 2 is an end view of the structure shown in FIG. 1 with portions broken away;

FIG. 3 is an enlarged detail view of a portion of the bag supply conveyor shown in FIG. 1;

FIG. 4 is a vertical sectional view of the structure shown in FIG. 3 taken substantially along the line 4—4;

FIG. 5 is an enlarged cross sectional view of a portion of the structure shown in FIG. 3 taken substantially along the line 5—5;

FIG. 6 is an enlarged detail view of a portion of the intermittent drive shown in FIGS. 1 and 2; and, FIG. 7 is a block diagram of the control system for my weighing and bagging machine.

Figure 1:
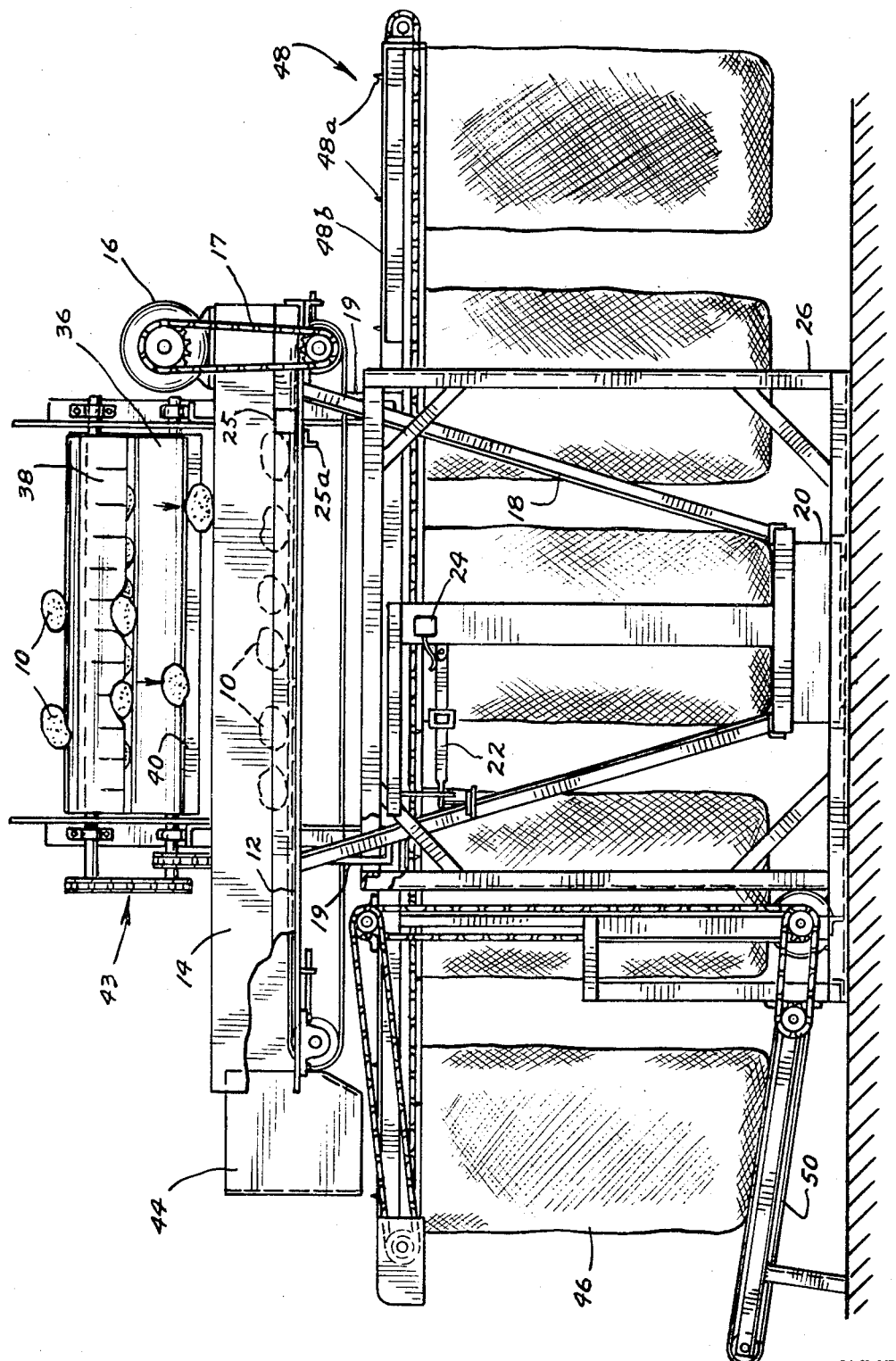
FIG. 1 is a side view of one embodiment of my invention with portions broken away.

Referring now to the figures, material such as potatoes to be bagged are designated by the reference numeral 10 and are delivered to a conveyor 12 which forms a weighing platform or table on which each batch is accumulated during the weighing operation. Side panels 14 are provided around the conveyor to keep the potatoes from falling off the conveyor. The conveyor is driven by a motor 16 through a chain or belt linkage 17. The weighing conveyor 12 is mounted on a downwardly tapered stand or frame 18 which is supported on the platform of a conventional weighing scale 20. The scale 20 is a balance beam type having a balance arm 22 which operates a switch 24. The weighing conveyor 12 is supported on the platform of scale 20 so that the entire conveyor and frame structure will be a free standing unit on the scale platform to permit each batch of potatoes to be weighed. When a pre-determined weight of potatoes has been accumulated on conveyor 12 the switch 24 will be closed and the conveyor drive motor 16 actuated. Also mounted on the conveyor 12 is a switch 25 which is controlled by a lug 25a on the conveyor to stop the conveyor drive motor 16 after each batch of potatoes has been discharged.

A rigid stationary frame 26 surrounds the weighing platform support frame 18 and is slightly spaced therefrom to positively prevent the weighing conveyor platform from tipping over as each batch of potatoes is weighed and discharged. A support strut 19 on the frame 18 contacts the frame 26 if uneven loading causes imbalance of the conveyor and frame unit. The strut guides the frame 18 to prevent the unit from excessive tilting on the scale platform.

The potatoes are fed from a supply source 28 to an inclined conveyor 30 having a plurality of cross slats 32 which lift potatoes upwardly from a hopper 34 to be discharged onto a relatively short feed conveyor 36. The conveyor 36 carries the potatoes under a gate 38 which may be a heavy flexible rubber scrap with slits cut therein. The gate is lifted by the passage of potatoes carried thereunder by the conveyor but will not allow the potatoes to roll freely thereunder unless driven by the conveyor 36. In addition, at the end of the short feed conveyor, a vertically adjustable stop-rod 40 is provided to prevent the potatoes from falling off the end of the conveyor belt onto the weighing conveyor 12 after the conveyor 36 has been stopped. Both conveyors 30 and 36 are driven through a belt or chain linkage by a motor 42 which is controlled by a control system hereinafter described. A differential drive mechanism 43 is provided so that the short horizontal feed conveyor 36 moves at approximately twice the linear speed of the inclined conveyor 30. This differential in speed is provided in order to spread out the potatoes on the feed conveyor 36 thereby spacing the potatoes one from another to allow the supply to be quickly stopped when the feed conveyor 36 is stopped when each batch has been weighed on the weighing conveyor 12 to produce an accurate batch weighing operation.

A bag filling station is provided at the discharge end of the weighing conveyor 12. A hopper 44 is supported on the main frame 26 and directs the potatoes into the bags 46 which are positioned thereunder by a bag supplying conveyor 48, also supported by the main frame 26. Bags are supplied to the bag supplying conveyor at the other end thereof by an operator. The conveyor 48 carries a plurality of empty bags which are advanced one by one through the frame 18 disposed below the weighing conveyor 12 into the filling position below the hopper 44 where the bags are filled when the conveyor 12 discharges the pre-weighed batch of potatoes. As shown in FIGS. 3, 4 and 5 the bag supply conveyor 48 consists of two parallel endless chains 48a having hooks 48b positioned thereon at intervals to support the bags. The hooks 48b are positioned so that each bag is hooked on four hooks to hold the top of the bag open to receive the batch of potatoes discharged through hopper 44. A track 48c is provided to support each of the chains 48a. Slide rods 48d and 48f are provided on each track 48c to form a race through which the bags 46 extend to mount on the hooks. Rod 48d positively urges the bags on hooks 48b. Rod 48f supports the bags in sliding relation in the race. A pair of rubber rollers 48e is provided at the discharge end of the conveyor 48. The rollers, in combination with rods 48f which are upturned at the end of the bag conveyor, lift the filled bags off the hooks 48b.

An inclined filled bag supporting conveyor 50 underlies the bags at the filling station and assists the operator in removing the filled bags. Obviously the bag handling conveyors 21 and 23 are stationary during the filling operation and as soon as the weighing conveyor has discharged its weighed batch of potatoes, the bag conveyor is automatically activated to position the next bag under the hopper 44. The bag supporting conveyor 50 is inclined upwardly to lift the bag to assist the operator in freeing the bag from the hooks 48b on the bag carrying conveyor. Thus the operator of the machine receives the bag of potatoes from the conveyor and need only balance the same as it comes off the end of the conveyor 48.

A motor 52 drives the bag carrying conveyor 48 and the bag supporting conveyor 50 through an intermittent drive system 53 which advances the bag carrying conveyor 48 at least the width of one bag to discharge the filled bag and position the next empty bag under the filling hopper 44. The filled bag supporting conveyor 50 is actuated to carry the filled bag away from the filling position and the intermittent drive system 53 moves the next empty bag into filling position under the hopper 44.

The intermittent drive system has a main drive chain 54 driven by the motor 52 through a sprocket 52a. The main drive chain is driven through one complete circuit for each intermittent drive cycle of operation corresponding to the filling and delivering of one bag of potatoes. The stopping of the motor 52 at the end of a cycle is controlled by means of a single chain link 58 on the left side of the main drive chain 54, as shown in FIG. 2, actuating a switch 56 placed on the main frame 26 and connected with the control system.

Secured to the inside or right hand of the main chain 54 is a secondary chain segment 60 which intermittently drives the bag carrying conveyor a predetermined relatively short increment. The details of this arrangement are shown in FIG. 6. This segment provides an intermittent step-by-step bag advance of approximately one bag at a time for the bag supporting hooks simultaneously with each longer advance of the bottom supporting conveyor 50. This allows the bag to travel forward and off the end of the bag carrying conveyor as the bag is further lifted and moved toward the operator of the machine.

Two rubber rollers, 60a and 60b, are placed on either side of a sprocket 60c driven by the main drive chain 54 so that when the chain segment 60 engages and drives a sprocket 60d connected with the bag supporting conveyor it will not cause the drive chain 54 to jump and become disengaged or to slip a chain link thereby upsetting the registration of the empty bags under the hopper 44.

Referring now to FIG. 7, a control circuit 62 is provided to coordinate the automatic weighing of batches of potatoes by my invention. The items previously referred to in the drawings are indicated schematically by blocks having the same number as the mechanical components. The weighing conveyor 12 is mechanically connected to the scale 20, the motor 16, and the switch 25 as previously described. The scale is mechanically connected to a switch 24 which in turn is connected electrically to the control circuit 62. The motor 16 and the switch 25 are also connected electrically to the control circuit. The intermittent drive system 53 is connected mechanically to motor 52 and switch 56 both of which are in turn connected to the control circuit electrically. The supply conveyor 36 is mechanically connected to a motor 32 which is electrically connected to the control circuit 62.

In operation, the first function of the machine is to deliver a batch of potatoes to the weighing conveyor. Therefore, the supply conveyors 30 and 36 are initially actuated and driven by motor 42 to deliver potatoes to the weighing conveyor 12. When the weight of the batch of potatoes on the conveyor 12 causes the scale 20 to actuate the switch 24 indicating that the predetermined weight constituting the batch has been reached, the supply conveyors 30 and 36 are stopped by shutting off the current to the motor 42. Simultaneously the motor 16, which drives the weighing conveyor, is turned on and the batch of potatoes is discharged through the hopper 44 and into a bag which has been placed in filling position. As has been previously described, the weighing conveyor has moved a sufficient distance to discharge the pre-weighed batch of potatoes into the bag. Operation of switch 25 initiates a new cycle of operation by starting motor 42 and thereby causing the supply conveyors 30 and 36 to again deliver potatoes onto the weighing conveyor 12 until the pre-determined weight forming a batch has been reached. Simultaneously with the weighing of the batch of potatoes the previously filled bag is discharged from the machine and a new bag is placed in bag filling position underneath the hopper 44 in preparation for the next filling operation. Thus at the time the supply conveyor motor 42 is actuated the motor 52 operating the bag supply conveyor 48 and the bag supporting conveyor 50 may be also activated to position an empty bag under the hopper 44 and discharge the filled bag. This operation may be completed before the weighing of the new batch of potatoes is completed and the switch 56 is actuated thereby causing the control circuit to stop the motor 52 and inactivate this portion of the machine. Operation of the switch 56 is also used as an interlock to prevent the weighing conveyor from discharging the weighed batch of potatoes until a new bag has been placed in position by the operation of the bag supplying conveyor 48. That is, the batch of potatoes cannot be dumped until the switch 56 has been actuated indicating that a new bag is in position and the old bag has been discharged from the machine.

It will be apparent that my invention offers several advantages over the prior art batch weighing and bagging machines. One of these advantages is the compactness of the machine which is achieved by delivering the bags to be filled to the bag filling station by means of a conveyor which carries the bags through the framework supporting the weighing conveyor 12. In effect, the same space is used for two purposes. Another advantage of my invention is that a minimum number of operators of the machine is required as the principal tasks consist of placing the empty sacks on the machine and removing the filled sacks. The frame structure required for the disclosed embodiment of my invention is such that the machine may be easily moved in a short time by a few men. This advantage is achieved in part because the machine has two separate frames which may be handled separately.

It will, of course, be understood that various changes may be made in the form, details, arrangement and proportion of the parts without departing from the scope of the invention, which generally stated, consists in the matter set forth in the accompanying claims.

I claim:

1. A batch weighing machine for weighing successive batches of material and for automatically discharging each weighed batch, comprising,
   a weighing scale having a weighing platform,
   a weighing conveyor disposed for receiving material to be weighed and having a discharge end from which weighed batches of material are discharged,
   a supporting stand for said conveyor extending downwardly from the conveyor to rest on the scale platform to provide the sole support for said conveyor and the material thereon,
   means for driving said weighing conveyor,
   control means responsive to said scale for actuating said conveyor drive means when a batch of material having a predetermined weight has been supplied to said conveyor to discharge said batch from said conveyor,
   a container conveyor system for positioning a container at the discharge end of said conveyor for receiving weighed batches of material, said system including,
   a pair of endless chains disposed in parallel relation,
   a pair of guide tracks for supporting and confining said chains,
   "a plurality of bag supporting hooks mounted on said endless chains,"
   at least one guide rod mounted on each guide track so slidingly support bags during advancement on said conveyor and so disposed as to positively urge bags on said hooks,
   a pair of rollers mounted at the end of said conveyor to positively lift the bags from said hooks at the end of travel of the conveyor, and
   means for driving said container conveyor.

2. A batch weighing machine for weighing successive batches of material and for automatically discharging each weighed batch, comprising,
   a weighing scale having a weighing platform,
   a weighing conveyor disposed for receiving material to be weighed and having a discharge end from which weighed batches of material are discharged,
   a supporting stand for said conveyor extending downwardly from the conveyor to rest on the scale platform to provide the sole support for said conveyor and the material thereon,
   means for driving said weighing conveyor,
   control means responsive to said scale for actuating said conveyor drive means when a batch of material having a pre-determined weight has been supplied to said conveyor to discharge said batch from said conveyor,
   a container supplying conveyor system for successively placing and holding containers at the discharge end of said weighing conveyor as successive batches of material are placed therein,
   a container supporting conveyor disposed at the discharge end of said weighing conveyor for receiving and supporting containers as successive batches of material are placed therein and for delivering said container to an operator of the machine,
   a motor,
   an intermittent drive mechanism connected with said motor driving said container supporting conveyor intermittently at least the width of one container to position an empty container at the discharge end of said weighing conveyor and deliver a filled container out of filling position and for driving said container bottom supporting conveyor a further distance to deliver said filled container to an operator of the machine in cooperation with said supporting conveyor, and
   said intermittent drive mechanism driving said container supporting conveyor at a greater rate of speed than said container supplying conveyor.

3. A batch weighing machine for weighing successive batches of material and for automatically discharging each weighed batch, comprising,
a weighing scale having a weighing platform,
a weighing conveyor disposed for receiving material to be weighed and having a discharge end from which weighed batches of material are discharged,
a supporting stand for said conveyor extending downwardly from the conveyor to rest on the scale platform to provide the sole support for said conveyor and the material thereon,
means for driving said weighing conveyor,
control means responsive to said scale for actuating said conveyor drive means when a batch of material having a pre-determined weight has been supplied to said conveyor to discharge said batch from said conveyor,
a container supplying conveyor system for successively placing and holding containers at the discharge end of said weighing conveyor as successive batches of material are placed therein,
a container supporting conveyor disposed at the discharge end of said weighing conveyor for receiving and supporting containers as successive batches of material are placed therein and for delivering said container to an operator of the machine,
a motor,
an intermittent drive mechanism connected with said motor driving said container supporting conveyor intermittently at least the width of one container to position an empty container at the discharge end of said weighing conveyor and deliver a filled container out of filling position and for driving said container bottom supporting conveyor a further distance to deliver said filled container to an operator of the machine in cooperation with said supporting conveyor,
said intermittent drive mechanism comprising,
an endless chain,
a drive sprocket for said chain,
a driven sprocket for said chain for driving the continuously driven container bottom supporting conveyor thereby,
a chain segment mounted on said endless chain in adjacent relationship to the drive engagement portion of said chain,
a pair of guide rollers mounted on either side of said driven sprocket to positively prevent the endless chain from jumping off said driven sprocket, and
a driven sprocket for engagement with said chain segment mounted adjacent to said chain driven sprocket for intermittently driving the container supplying conveyor.

4. In combination with a platform type floor-supported scale, a batch weighing and bag filling machine for weighing successive batches of material and for automatically discharging each weighed batch into a bag supported on a conveyor, comprising,
a weighing scale having a weighing platform,
a weighing conveyor disposed for receiving material to be weighed and having a discharge end from which weighed batches of material are discharged,
a supporting stand for said conveyor extending downwardly from the conveyor to rest on the scale platform to provide the sole support for said conveyor and the material thereon,
means for driving said conveyor,
control means responsive to said scale for actuating said conveyor drive means when a batch of material having a pre-determined weight has been supplied to said conveyor to discharge said batch from said conveyor,
said supporting stand constituting a substantially inverted U-shaped frame structure positioning said weighing conveyor at a substantial elevation above the platform of said scale,
a container supplying conveyor system disposed under said weighing conveyor extending through the clear space provided by said inverted U-shaped supporting stand and supported independently thereof for transporting containers from a container loading station to the discharge end of the weighing conveyor.

5. The structure set forth in claim 4 and a feed conveyor delivering material to said weighing conveyor and a fixed stop member extending across the width of the feed conveyor and having the upper edge spaced a pre-determined distance above the discharge end of said feed conveyor to restrict the flow of material therefrom and positively stop the discharge of material being fed onto said weighing conveyor when the feed conveyor is stopped.

* * * * *